(12) United States Patent
Tarascon et al.

(10) Patent No.: US 12,021,192 B2
(45) Date of Patent: Jun. 25, 2024

(54) ELECTROLYTE COMPOSITION FOR SODIUM-ION BATTERY

(71) Applicants: Centre national de la recherche scientifique, Paris (FR); College de France, Paris (FR); Sorbonne Université, Paris (FR)

(72) Inventors: Jean-Marie Tarascon, Paris (FR); Guochun Yan, Changsha (CN)

(73) Assignees: CENTRE NATIONAL DE LA RECHERCHE SCIENTIFIQUE, Paris (FR); COLLEGE DE FRANCE, Paris (FR); SORBONNE UNIVERSITÉ, Paris (FR)

( * ) Notice: Subject to any disclaimer, the term of this patent is extended or adjusted under 35 U.S.C. 154(b) by 695 days.

(21) Appl. No.: 17/252,981

(22) PCT Filed: Jun. 18, 2019

(86) PCT No.: PCT/EP2019/066061
§ 371 (c)(1),
(2) Date: Dec. 16, 2020

(87) PCT Pub. No.: WO2019/243351
PCT Pub. Date: Dec. 26, 2019

(65) Prior Publication Data
US 2021/0119259 A1   Apr. 22, 2021

(30) Foreign Application Priority Data
Jun. 18, 2018  (EP) .................... 18305743

(51) Int. Cl.
*H01M 10/0567* (2010.01)
*H01M 4/133* (2010.01)
(Continued)

(52) U.S. Cl.
CPC ....... *H01M 10/0567* (2013.01); *H01M 4/133* (2013.01); *H01M 4/1393* (2013.01);
(Continued)

(58) Field of Classification Search
None
See application file for complete search history.

(56) References Cited

U.S. PATENT DOCUMENTS

2018/0190987 A1*  7/2018  Tarascon ............... H01B 1/02

FOREIGN PATENT DOCUMENTS

| CN | 103597647 A | 2/2014 |
|---|---|---|
| CN | 105541890 A | 5/2016 |

(Continued)

OTHER PUBLICATIONS

International Search Report from PCT/EP2019/066061, issued Sep. 2, 2019.
(Continued)

*Primary Examiner* — Lucas J. O'Donnell
(74) *Attorney, Agent, or Firm* — Knobbe, Martens, Olson & Bear, LLP

(57) ABSTRACT

An electrolyte composition includes at least a sodium salt dissolved in at least one solvent and a combination of additives. The solvent is any of ethylene carbonate, dimethyl carbonate, ethyl methyl carbonate, diethyl carbonate, propylene carbonate, ethyl acetate, ethyl propionate, methyl propionate, 4-fluorotoluene, 1,1,2,2-tetrafluoroethyl 2,2,3,3-tetrafluoropropyl ether, di-fluoro ethylene carbonate, ethyl difluoroacetate, or mixtures of the foregoing. The combination of additives includes at least sodium difluoro(oxalato) borate (NaODFB) and tris(trimethylsilyl)phosphite (TMSPi).

15 Claims, 9 Drawing Sheets

Figure 1:
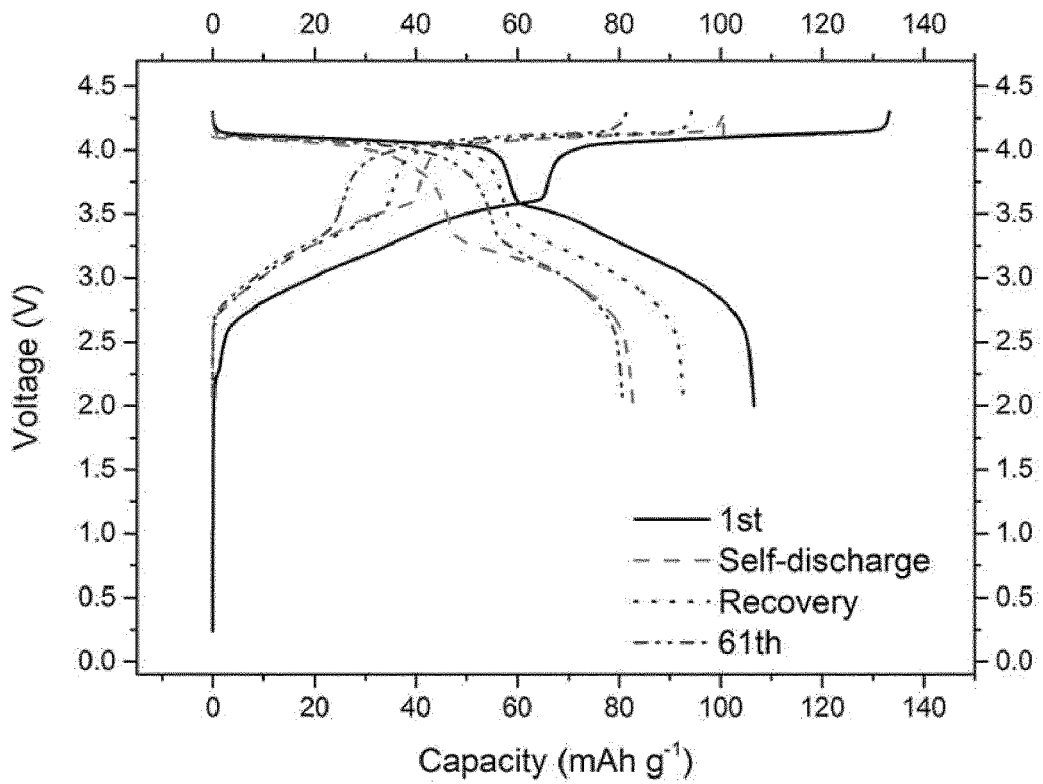

(51) Int. Cl.
  *H01M 4/1393* (2010.01)
  *H01M 4/62* (2006.01)
  *H01M 10/054* (2010.01)
  *H01M 10/0568* (2010.01)
  *H01M 10/0569* (2010.01)

(52) U.S. Cl.
  CPC ......... *H01M 4/622* (2013.01); *H01M 10/054* (2013.01); *H01M 10/0568* (2013.01); *H01M 10/0569* (2013.01); *H01M 2300/0037* (2013.01); *H01M 2300/0051* (2013.01)

(56) References Cited

FOREIGN PATENT DOCUMENTS

| CN | 108172816 A | 6/2018 |
|---|---|---|
| WO | WO 2016/202868 A1 | 12/2016 |

OTHER PUBLICATIONS

Jang, Jun Yeong et al., "Interfacial architectures based on a binary additive combination for high-performance $Sn_4P_3$ anodes in sodium-ion batteries", Journal of Materials Chemistry A, vol. 3, No. 16, pp. 8332-8338, 2015.

Chen, Juner, et al., "Sodium-difluoro(oxalato)borate (NaDFOB): a new electrolyte salt for Na-ion batteries", Chemical Communications, vol. 51, No. 48, pp. 9809-9812, 2015.

* cited by examiner

ELECTROLYTE COMPOSITION FOR SODIUM-ION BATTERY

The present invention concerns a new electrolyte composition for sodium-ion battery, and uses thereof as a non-aqueous liquid electrolyte in a sodium-ion battery.

The sodium-ion (Na-ion) technology appears as a promising alternative candidate for next-generation batteries, especially in the stationary energy storage field due to the high natural abundance and low cost of sodium as compared to lithium. This has led over the last decade to a blooming research on various components of sodium-ion batteries developing new and superior electrode materials for optimized Na-ion battery systems. Two types of technology based either on polyanionic $Na_3V_2(PO_4)_2F_3$ or layered compounds $Na_{0.67}Mn_{0.5}Fe_{0.5}O_2$ have emerged, with the former being the most performing in terms of power rate, cyclelife and energy density.

However, for practical applications, other figures of merits, such as high temperature performances (55° C.), self-discharge and durability, strongly depend on the solid electrolyte interphase (SEI) that must be satisfied. This calls for an intensive research on the nature of the electrolyte used. At the early stage, researchers naively believe that we could simply make an extrapolation of what has been used for the Li-ion technology, but this was without counting that the solubility of Na-based organic products is different compared with those of Li-counterparts owing to the milder acidity of $Na^+$ as compared to $Li^+$.

In light of such remarks, the inventors experienced that $Na_3V_2(PO_4)_2F_3$/C cells based on classical EC-PC-DMC-1 mol/L $NaPF_6$ electrolytes were performing exceedingly well at room temperature, but were showing bad performances at 55° C. in terms of cycling and self-discharge.

To date, the inventors have implemented a specific electrolyte based on a mixture of EC-PC and $NaPF_6$ to which a few additives; sodium difluoro(oxalato)borate (NaODFB), succonitrile N≡C—$(CH_2)_2$—C≡N, 1,3-propane sultone, and vinylene carbonate.

However, this electrolyte has some drawbacks, such as its inability to be used with commercial polyolefin separators because of a poor wettability, high viscosity and the decrease of the cell power capability (high resistance SEI).

There is thus still a need of an improved electrolyte composition which could alleviate the above limitations while preserving the benefits.

Thus, the aim of the present invention is to provide a new electrolyte composition for Na-ion battery with improved properties over the known electrolyte compositions.

The aim of the present invention is also to provide a non-aqueous electrolyte having the ability of minimizing parasitic reactions to achieve high capacity retention capability and reduced self-discharge of Na-ion batteries, at cycling temperatures ranging from ambient temperature (i.e. 20-25° C.) to higher temperatures, in particular up to 55° C.

Another aim of the present invention is to provide an electrolyte composition for Na-ion battery with improved wettability properties.

Another aim of the present invention is to provide an electrolyte composition for Na-ion battery which may be used in combination with commercial polyolefin separators.

Another aim of the present invention is to provide an electrolyte composition for Na-ion battery allowing the tailoring of the SEI thickness.

Therefore, the present invention relates to an electrolyte composition comprising at least a sodium salt dissolved in at least one solvent and a combination of additives, wherein:

said solvent is selected from the group consisting of: ethylene carbonate, dimethyl carbonate, ethyl methyl carbonate, diethyl carbonate, propylene carbonate, ethyl acetate, ethyl propionate, methyl propionate, 4-fluorotoluene, 1,1,2,2-tetrafluoroethyl 2,2,3,3-tetrafluoropropyl ether, di-fluoro ethylene carbonate, ethyl difluoroacetate, and mixtures thereof;

the combination of additives includes at least sodium difluoro(oxalato)borate (NaODFB) and tris(trimethylsilyl)phosphite (TMSPi).

The electrolyte of the invention is based on the use of two additives which are NaODFB and TMSPi. The specificity of this new electrolyte is the use of TMSPi.

This new electrolyte has been implemented by searching the efficient additives so as to properly and wisely tune the SEI thickness and composition.

The electrolyte composition of the invention combines the positive attribute (wettability) of the early Na-based electrolyte together with the benefits provided by the additives (tailoring of the SEI thickness) fulfilled by specific chemical tuning.

According to an embodiment, the amount of sodium difluoro(oxalato)borate in the electrolyte composition of the invention ranges from 0.05 to 10 wt. %, relatively to the total weight of said electrolyte composition.

According to an embodiment, the amount of tris(trimethylsilyl)phosphite in the electrolyte composition of the invention ranges from 0.05 to 10 wt. %, relatively to the total weight of said electrolyte composition.

Preferably, the solvent as defined above is selected from the group consisting of: ethylene carbonate, dimethyl carbonate, ethyl methyl carbonate, diethyl carbonate, propylene carbonate, ethyl propionate, 4-fluorotoluene, 1,1,2,2-tetrafluoroethyl 2,2,3,3-tetrafluoropropyl ether, and mixtures thereof.

According to a particular embodiment of the present invention, the solvent is a mixture of at least two solvents comprising ethylene carbonate (EC) as a first solvent and a second solvent selected from the group consisting of dimethyl carbonate (DMC), ethyl methyl carbonate (EMC), diethyl carbonate (DEC), propylene carbonate (PC), ethyl propionate (EP), and 1,1,2,2-tetrafluoroethyl 2,2,3,3-tetrafluoropropyl ether (HFE).

Preferably, the second solvent is PC or DMC, more preferably PC.

The volume ratio of the first solvent to the second solvent may range in from 1:20 to 20:1 and preferably from 1:9 to 5:1.

A mixture of ethylene carbonate and propylene carbonate in a volume ratio of 1:1 is particularly preferred according to the present invention.

According to an embodiment, the electrolyte composition of the present invention includes sodium difluoro(oxalato)borate, tris(trimethylsilyl)phosphite, ethylene carbonate, and propylene carbonate.

According to an embodiment, the electrolyte composition of the present invention further comprises dimethyl carbonate.

According to an embodiment, the electrolyte composition of the present invention includes sodium difluoro(oxalato)borate, tris(trimethylsily)phosphite, ethylene carbonate, and dimethyl carbonate.

According to an embodiment, the electrolyte composition of the invention further comprises an additional carbonate chosen among vinylene carbonate and vinyl ethylene carbonate, preferably vinylene carbonate (VC).

Preferably, the amount of said additional carbonate in the electrolyte composition of the invention ranges from 0.1 to 10.0 wt. %, relatively to the total weight of said electrolyte composition.

Especially, the addition of VC to the electrolyte composition of the invention further enhances the electrolyte performance due to the synergetic effect between VC and TMSPi previously experimented with the Li-ion technology. Besides, VC helps to minimize the degradation of DMC via the formation of an elastomer, hence depressing the continuous reduction of DMC and limiting the amount of soluble species moving to the positive electrode.

The nature of the sodium salts is not such critical according to the invention. The sodium salt may be chosen among the salt commonly used in non-aqueous electrolyte suited for Na-ion batteries. As examples of sodium salt, one can mention sodium hexafluorophosphate ($NaPF_6$), sodium perchlorate ($NaClO_4$), sodium bis (fluorosulfonyl) imide (NaFSI), sodium bis(trifluoromethanesulfonyl)imide (NaTFSI), sodium bis(pentafluoroethanesulfonyl)imide (NaBETI), sodium tetrafluoroborate ($NaBF_4$), and one of their mixture.

Preferably, the sodium salt is $NaPF_6$.

The amount of sodium salt in the electrolyte composition may range from about 0.1 to 3.0 mol/L and preferably from about 0.5 to 2.0 mol/L.

As an example of electrolyte composition of the invention, one can mention the following electrolyte composition comprising:
NaODFB in an amount of 0.5 wt. %,
TMSPi in an amount of 1.0 wt. %,
a sodium salt, in particular 1 mol/L of $NaPF_6$, and
EC/PC in a volume ratio of 1:1.

As another specific example of electrolyte composition of the invention, one can mention the following electrolyte composition comprising:
NaODFB in an amount of 0.5 wt. %,
TMSPi in an amount of 1.0 wt. %,
vinylene carbonate in an amount of 3.0 wt. %,
a sodium salt, in particular 1 mol/L of $NaPF_6$, and
EC/PC in a volume ratio of 1:1.

As another example of electrolyte composition of the invention, one can mention the following electrolyte composition comprising:
NaODFB in an amount of 0.5 wt. %,
TMSPi in an amount of 1.0 wt. %,
a sodium salt, in particular 1 mol/L of $NaPF_6$, and
EC/DMC in a volume ratio of 1:1.

As another specific example of electrolyte composition of the invention, one can mention the following electrolyte composition comprising:
NaODFB in an amount of 0.5 wt. %,
TMSPi in an amount of 1.0 wt. %,
vinylene carbonate in an amount of 3.0 wt. %,
a sodium salt, in particular 1 mol/L of $NaPF_6$, and
EC/DMC in a volume ratio of 1:1.

The electrolyte composition of the present invention may be prepared by any method known in the technical field, in particular by mixing the first and second solvent in the desired volume ratio, preferably under stirring, and then adding the sodium salt and the combination of additives into the solution. The adding sequence may be changed like adding the combination of the additives onto the mixture of solvents and then adding the sodium salt. The whole process is preferably carried out in inert atmosphere, for example under argon or nitrogen gas.

As already mentioned, the electrolyte composition of the present invention is particularly suited to be used in a Na-ion battery.

Therefore, the present invention also relates to the use of an electrolyte composition as defined above, as a non-aqueous liquid electrolyte in a Na-ion battery, in particular for a Na-ion battery comprising a hard carbon negative electrode including a binder, in particular carboxymethylcellulose.

The present invention also relates to the use of an electrolyte composition as defined above as a non-aqueous liquid electrolyte to reduce self-discharge and enhance retention capacity in a Na-ion battery, particularly in a Na-ion battery comprising a hard carbon negative electrode including a binder, in particular carboxymethylcellulose.

According to this object, the reduction of self-discharge is observed when said battery is cycling at a temperature ranging from about room temperature (20-25° C.) to 55° C.

The present invention also relates to a Na-ion battery comprising:
at least one positive electrode comprising at least one positive electrode active material and a current collector,
at least one negative electrode comprising a negative electrode active material, and
at least one separator impregnated with a non-aqueous liquid electrolyte, said separator being placed between said positive electrode and said negative electrode,
wherein said non-aqueous liquid electrolyte is an electrolyte composition as defined above.

The positive electrode active material is a material capable of inserting sodium ions reversibly which may be chosen among oxides such as $Na_xMO_2$ in which M represents at least one metallic element selected from the group comprising Ni, Co, Mn, Fe, Cr, Ti, Cu, V, Al and Mg and phosphates such as $NaTi_2(PO_4)_3$, $Na_3V_2(PO_4)_3$, $Na_3V_2(PO_4)_2F_3$, $Na_2MnP_2O_7$, $Na_2MnPO_4F$, $Na_{1.5}VPO_{4.8}F_{0.7}$ and $NaV_{1-x}Cr_xPO_4F$. Among these positive electrode active materials, $Na_3V_2(PO_4)_2F_3$, also named NVPF, $Na_{2/3}Mg_{1/3}Mn_{2/3}O_2$, and a mixture thereof, are particularly preferred.

In addition to the positive electrode active material, the positive electrode may further include a polymer binder and optionally an electronic conducting agent.

As example of polymer binder, mention may be made of polyvinylidene difluoride (PVdF), poly(tetrafluoroethylene) (PTFE), cellulose fibers, cellulose derivatives such as starch, carboxymethyl cellulose (CMC), diacetyl cellulose, hydroxyethyl cellulose or hydroxypropyl cellulose, styrene butadiene rubber (SBR) and a mixture thereof. Among these binders, PVdF is preferred.

The conductive agent may be carbon black, Super P carbon black, acetylene black, ketjen black, channel black, natural or synthetic graphite, carbon fibers, carbon nanotubes, vapor grown carbon fibers or a mixture thereof.

The weight proportions, relatively to the total weight of the positive electrode, are preferably:
Positive electrode active material: 80 to 98%
Electronic conducting agent: 1 to 10%
Polymer binder: 1 to 10%.

The negative electrode active material used for the negative electrode can be selected among carbon materials, in particular hard carbon, soft carbon, carbon nanofibers or carbon felt, antimony, tin, and phosphorus.

According to a preferred embodiment of the present invention, the negative electrode active material is a carbon material and said negative electrode further comprises a polymer binder which may be chosen among the same polymer binders as those mentioned above for the positive electrode, and preferably from cellulose derivatives binders.

As mentioned for the positive electrode, the negative electrode may further include a conductive agent which may be chosen among the same conductive agent as those mentioned above for the positive electrode.

The negative electrode may also include a current collector.

The current collectors of the positive and negative electrodes may be composed of a conductive material, more particularly of a metallic material which may be selected from aluminum, copper, nickel, titanium and steel.

The separator may be a conventional polymer-based separator including polypropylene and/or polyethylene such as a Celgard® separator or glass fibers, such as a Whatman® borosilicate glass fiber separator, or a cellulose-based separator, such as a Dreamweaver® nonwoven nanofiber separator.

A Na-ion battery according to the invention may be composed of a single electrochemical cell comprising two electrodes (i.e. one positive electrode and one negative electrode) separated by an electrolyte; or of a plurality of chemical cells assembled in series; or of a plurality of chemical cells assembled in parallel; or of a combination of the two assembly types.

FIGURES

FIG. 1 gives the evolution of the voltage (V) as a function of capacity (in mAh $g^{-1}$ based on the positive electrode active material mass) for a Na-ion battery comprising a comparative composition EC1 as non-aqueous liquid electrolyte.

Figure 2:
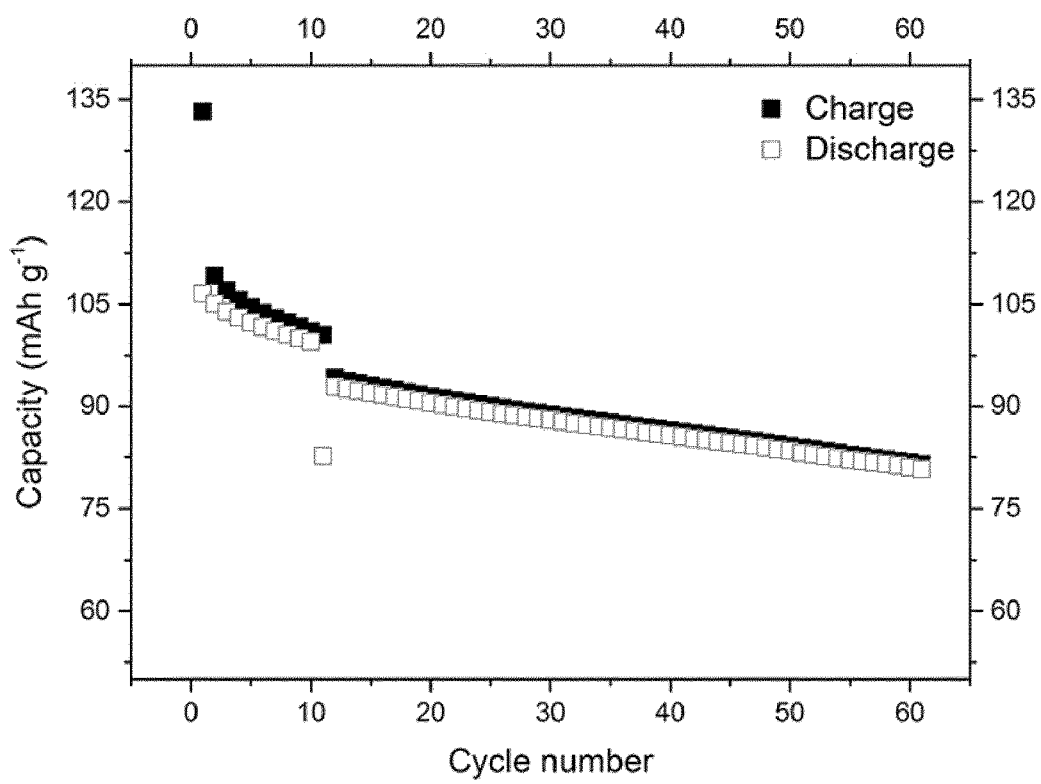

FIG. 2 gives the evolution of the capacity (in mAh $g^{-1}$ based on the positive electrode active material mass) as a function of the number of cycles for a Na-ion battery comprising a comparative composition EC1 as non-aqueous liquid to electrolyte.

Figure 3:
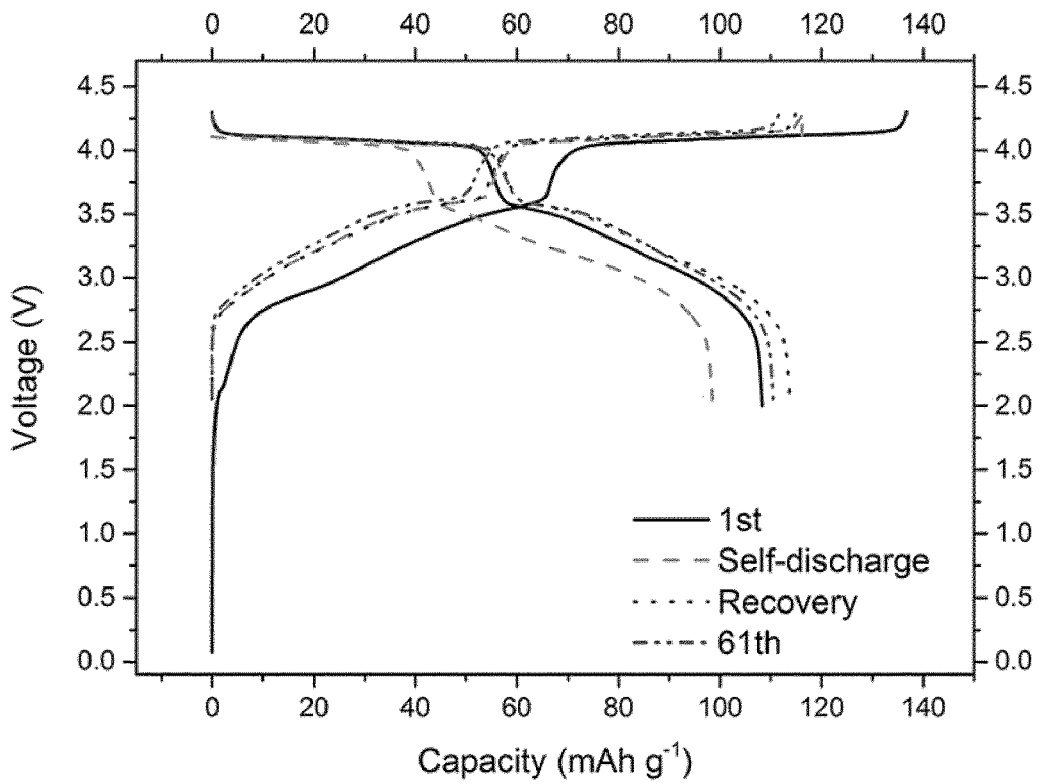

FIG. 3 gives the evolution of the voltage (V) as a function of capacity (in mAh $g^{-1}$ based on the positive electrode active material mass) for a Na-ion battery comprising a composition EC2 according to the invention as non-aqueous liquid electrolyte.

Figure 4:
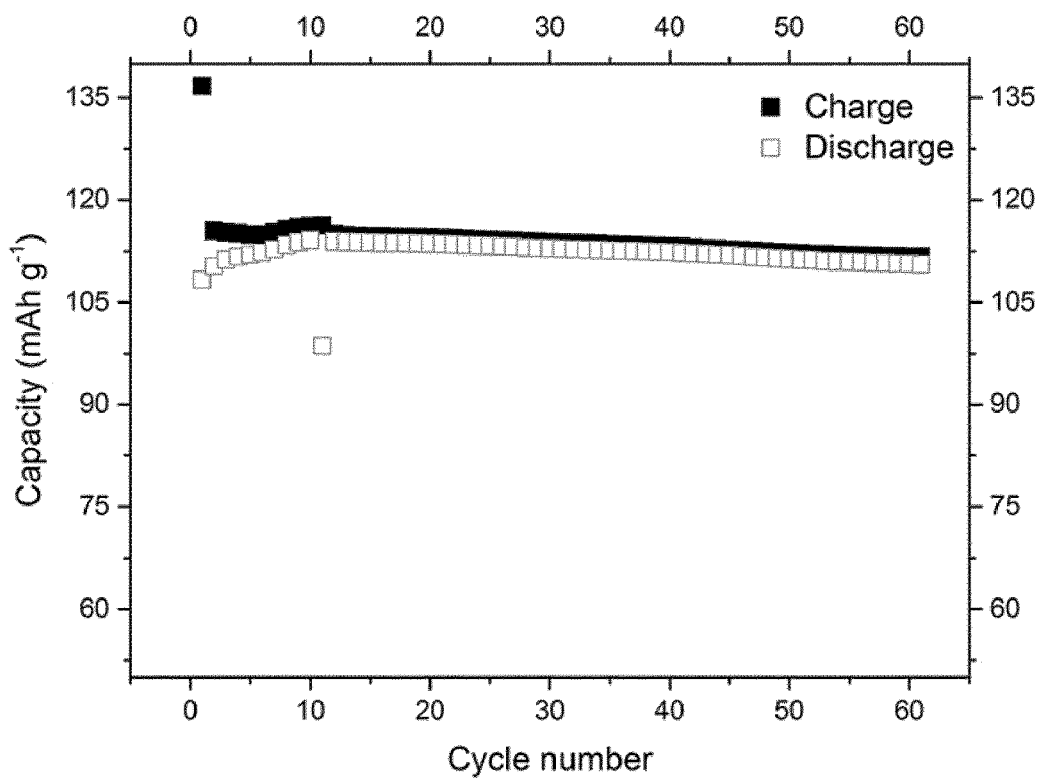

FIG. 4 gives the evolution of the capacity (in mAh $g^{-1}$ based on the positive electrode active material mass) as a function of the number of cycles for a Na-ion battery comprising a composition EC2 according to the invention as non-aqueous liquid electrolyte.

Figure 5:
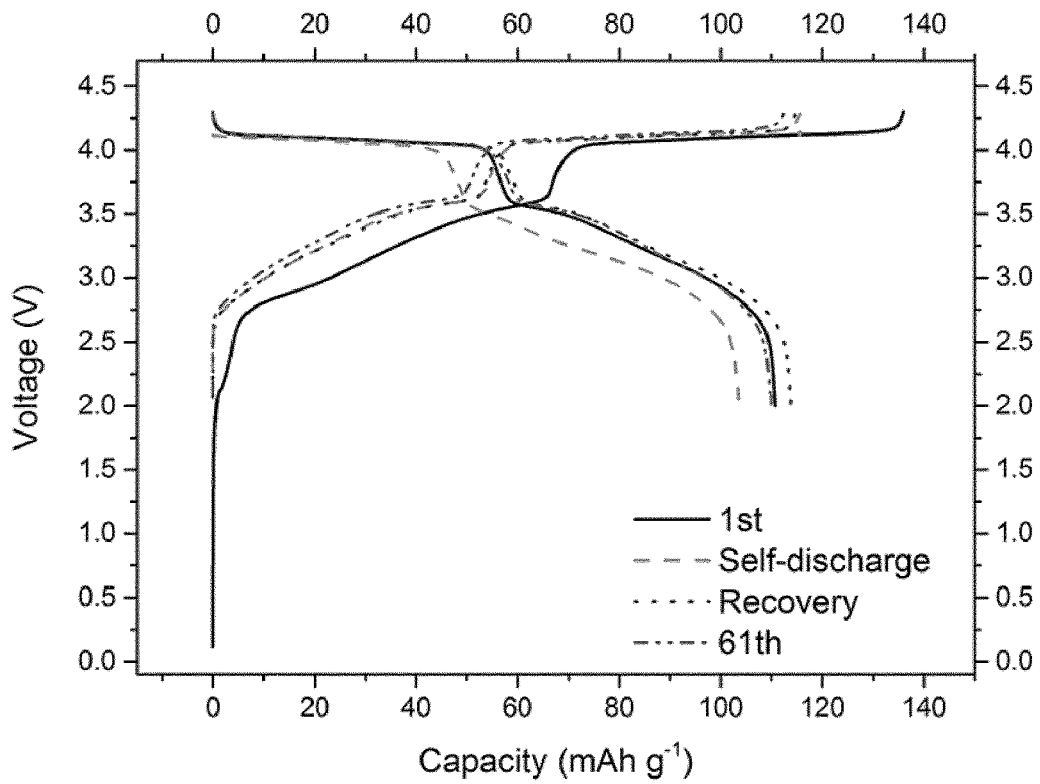

FIG. 5 gives the evolution of the voltage (V) as a function of capacity (in mAh $g^{-1}$ based on the positive electrode active material mass) for a Na-ion battery comprising a composition EC3 according to the invention as non-aqueous liquid electrolyte.

Figure 6:
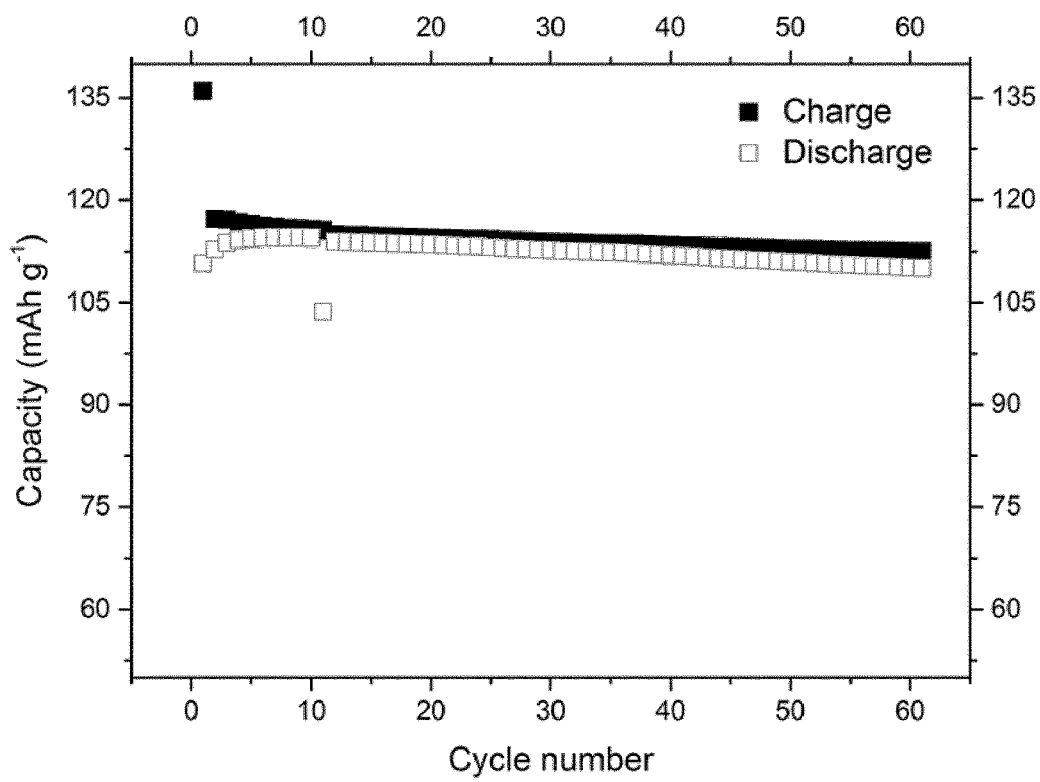

FIG. 6 gives the evolution of the capacity (in mAh $g^{-1}$ based on the positive electrode active material mass) as a function of the number of cycles for a Na-ion battery comprising a composition EC3 according to the invention as non-aqueous liquid electrolyte.

Figure 7:
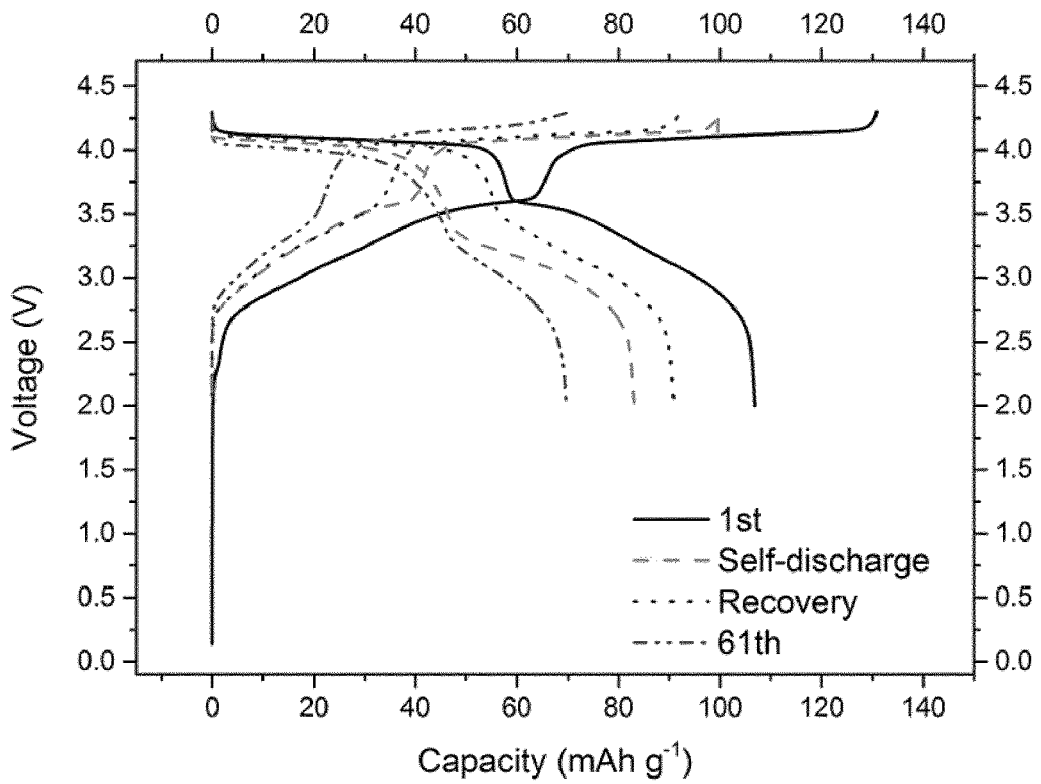

FIG. 7 gives the evolution of the voltage (V) as a function of capacity (in mAh $g^{-1}$ based on the positive electrode active material mass) for a Na-ion battery comprising a comparative composition EC4 as non-aqueous liquid electrolyte.

Figure 8:
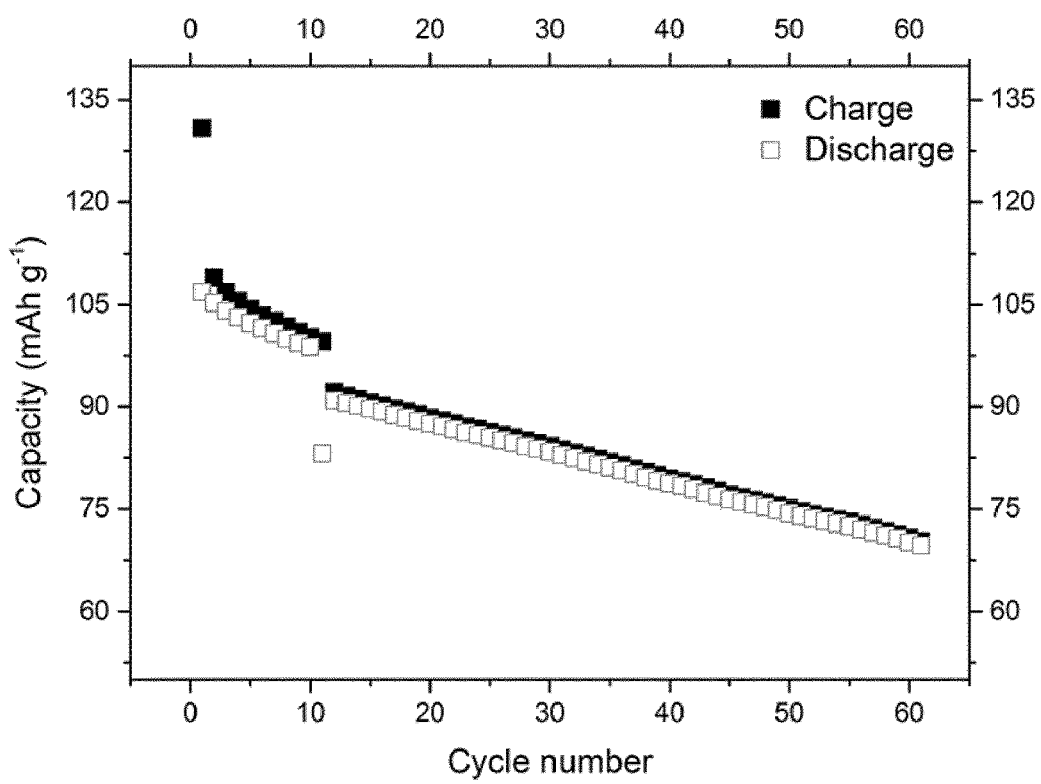

FIG. 8 gives the evolution of the capacity (in mAh $g^{-1}$ based on the positive electrode active material mass) as a function of the number of cycles for a Na-ion battery comprising a comparative composition EC4 as non-aqueous liquid electrolyte.

Figure 9:
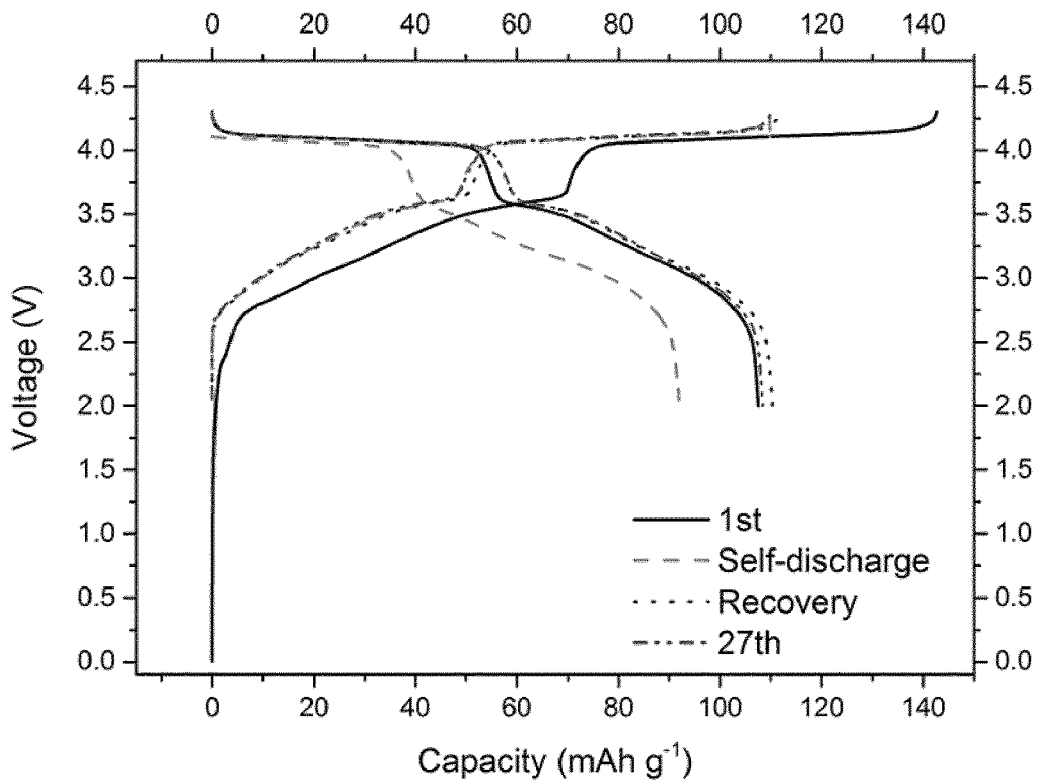

FIG. 9 gives the evolution of the voltage (V) as a function of capacity (in mAh $g^{-1}$ based on the positive electrode active material mass) for a Na-ion battery comprising a comparative composition EC5 as non-aqueous liquid electrolyte.

Figure 10:
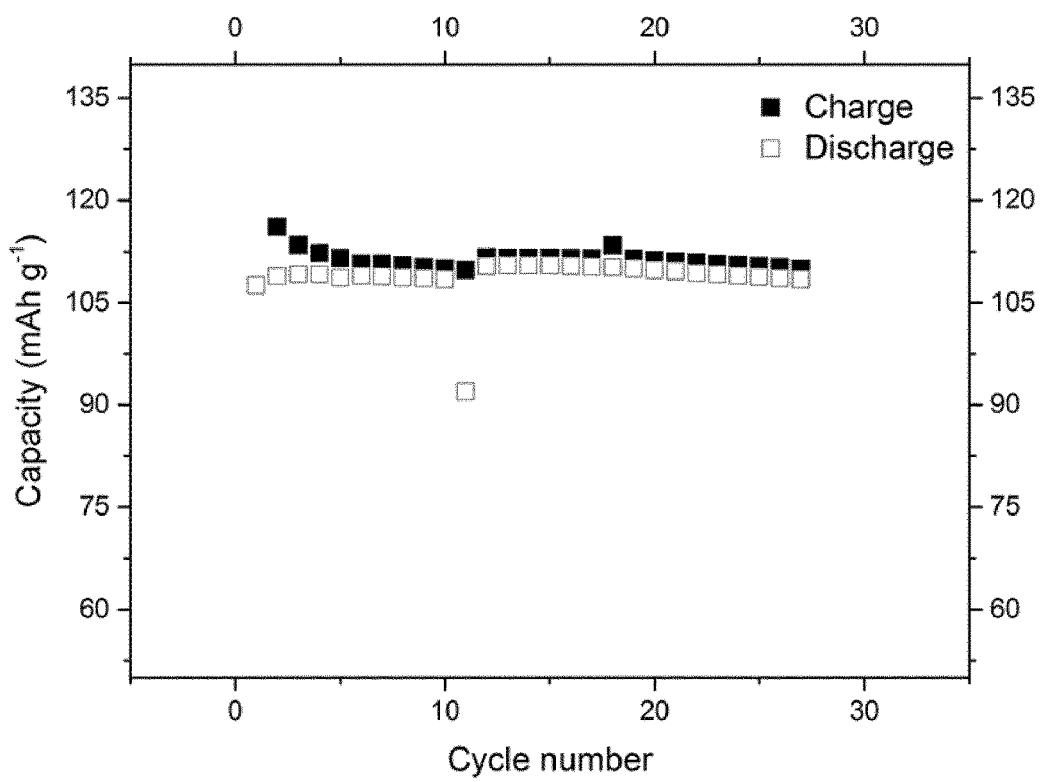

FIG. 10 gives the evolution of the capacity (in mAh $g^{-1}$ based on the positive electrode active material mass) as a function of the number of cycles for a Na-ion battery comprising a comparative composition EC5 as non-aqueous liquid electrolyte.

Figure 11:
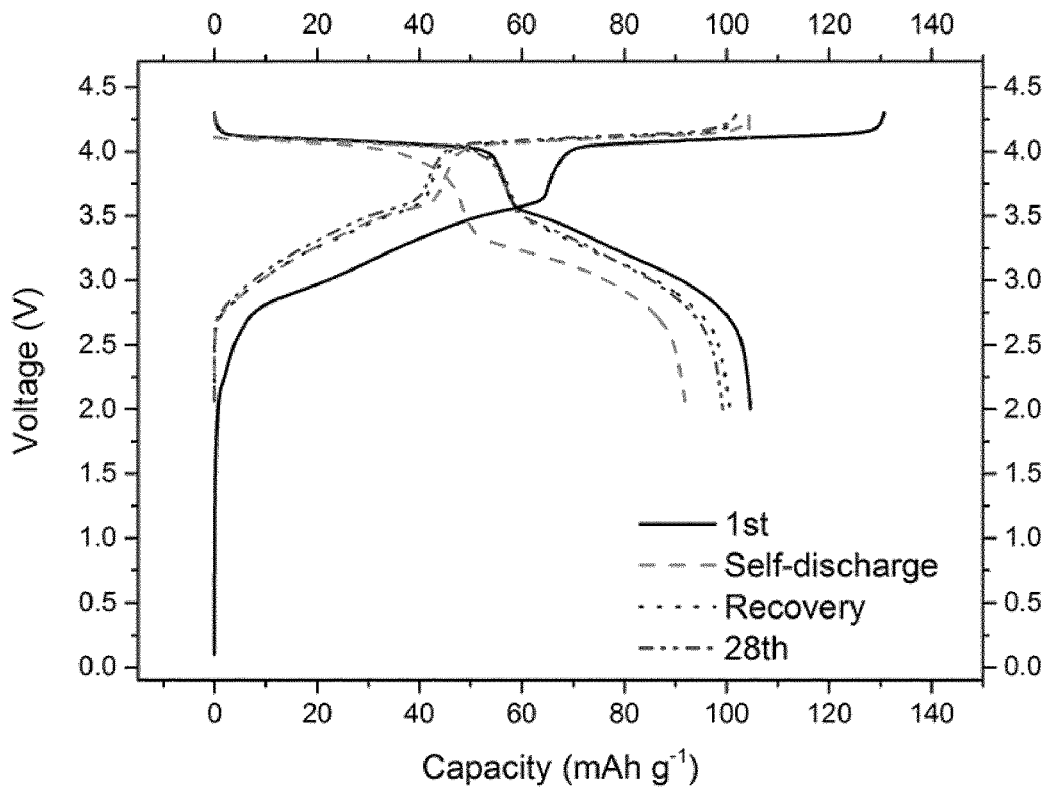

FIG. 11 gives the evolution of the voltage (V) as a function of capacity (in mAh $g^{-1}$ based on the positive electrode active material mass) for a Na-ion battery comprising a comparative composition EC6 as non-aqueous liquid electrolyte.

Figure 12:
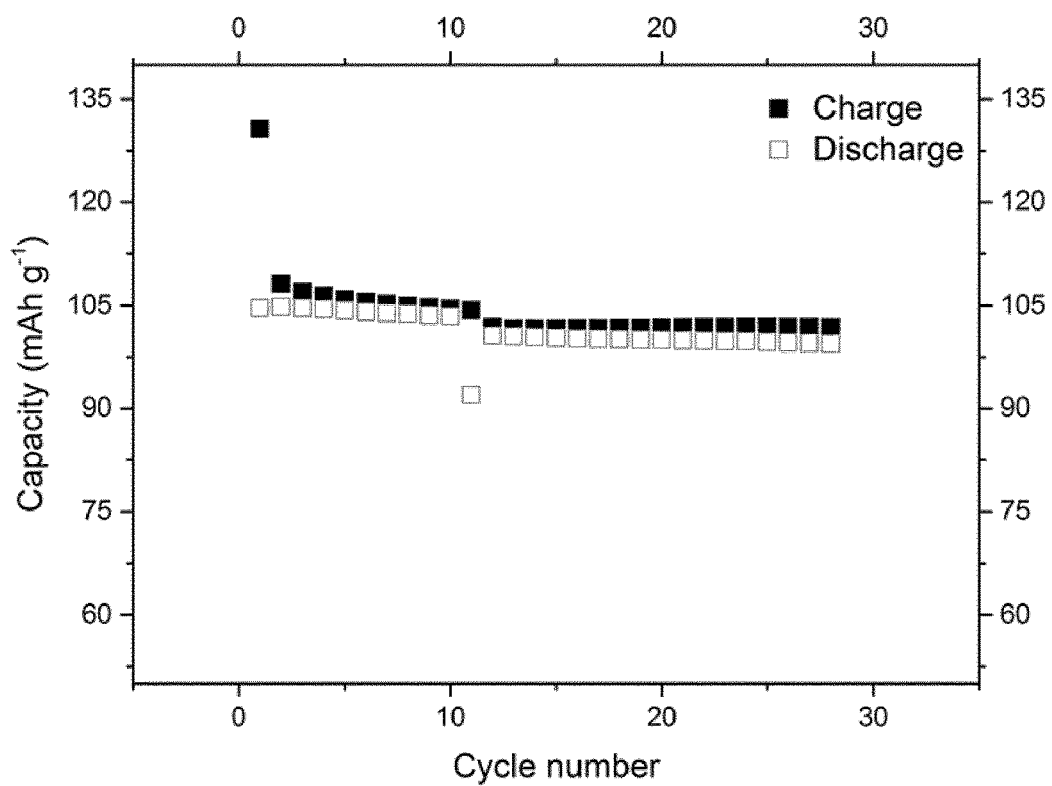

FIG. 12 gives the evolution of the capacity (in mAh $g^{-1}$ based on the positive electrode active material mass) as a function of the number of cycles for a Na-ion battery comprising a comparative composition EC6 as non-aqueous liquid electrolyte.

Figure 13:
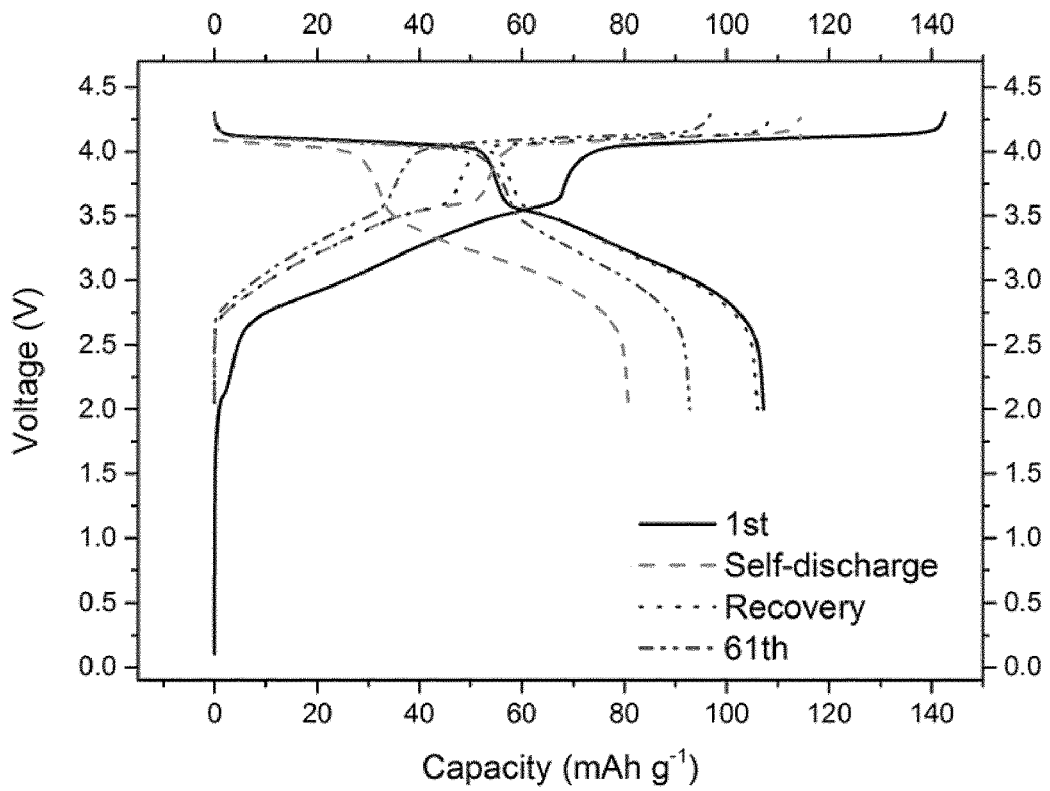

FIG. 13 gives the evolution of the voltage (V) as a function of capacity (in mAh $g^{-1}$ based on the positive electrode active material mass) for a Na-ion battery comprising a composition EC7 according to the invention as non-aqueous liquid electrolyte.

Figure 14:
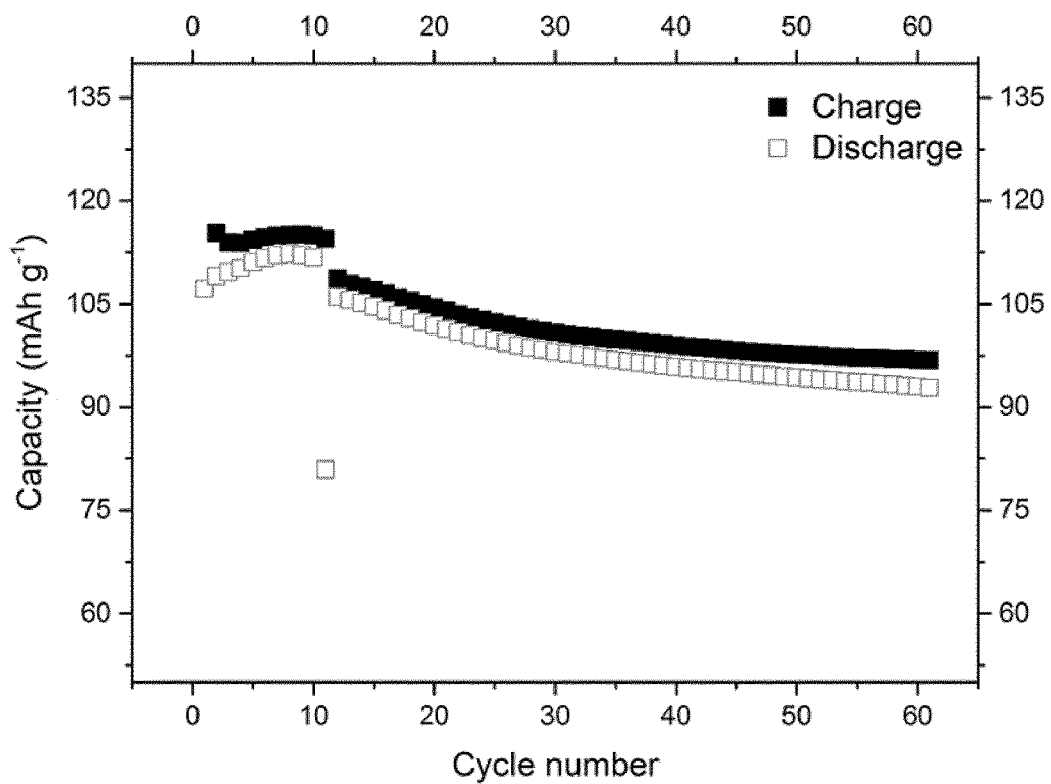

FIG. 14 gives the evolution of the capacity (in mAh $g^{-1}$ based on the positive electrode active material mass) as a function of the number of cycles for a Na-ion battery comprising a composition EC7 according to the invention as non-aqueous liquid electrolyte.

Figure 15:
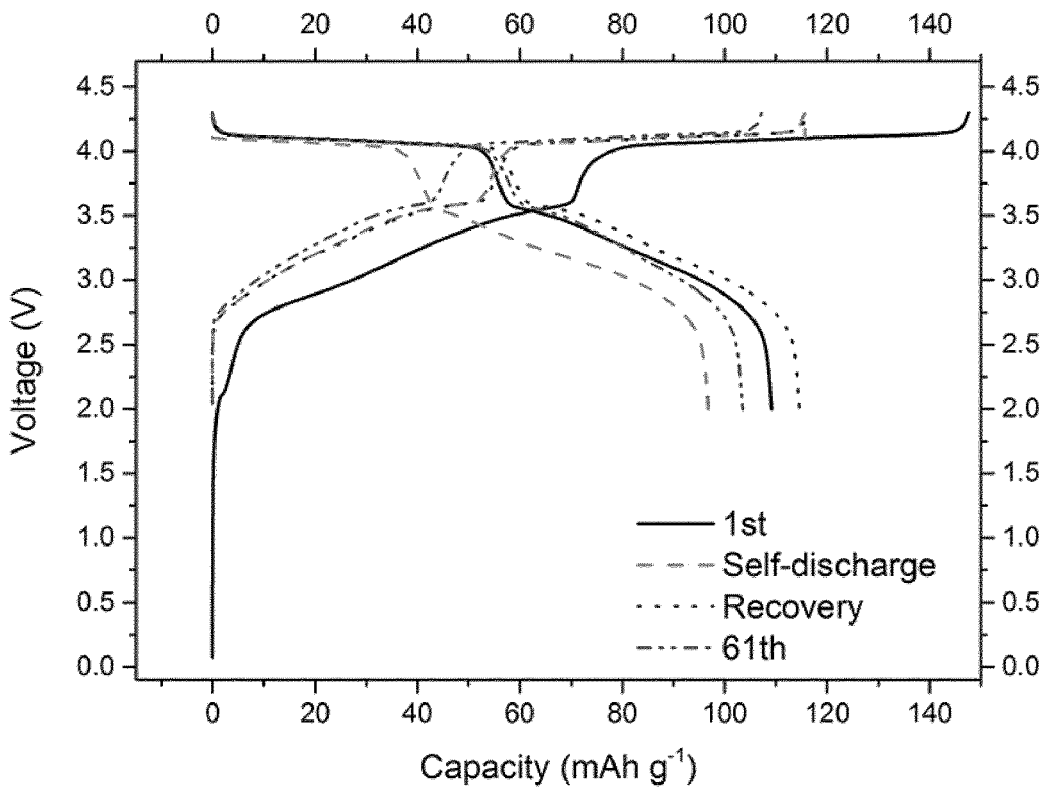

FIG. 15 gives the evolution of the voltage (V) as a function of capacity (in mAh $g^{-1}$ based on the positive electrode active material mass) for a Na-ion battery comprising a composition EC8 according to the invention as non-aqueous liquid electrolyte.

Figure 16:
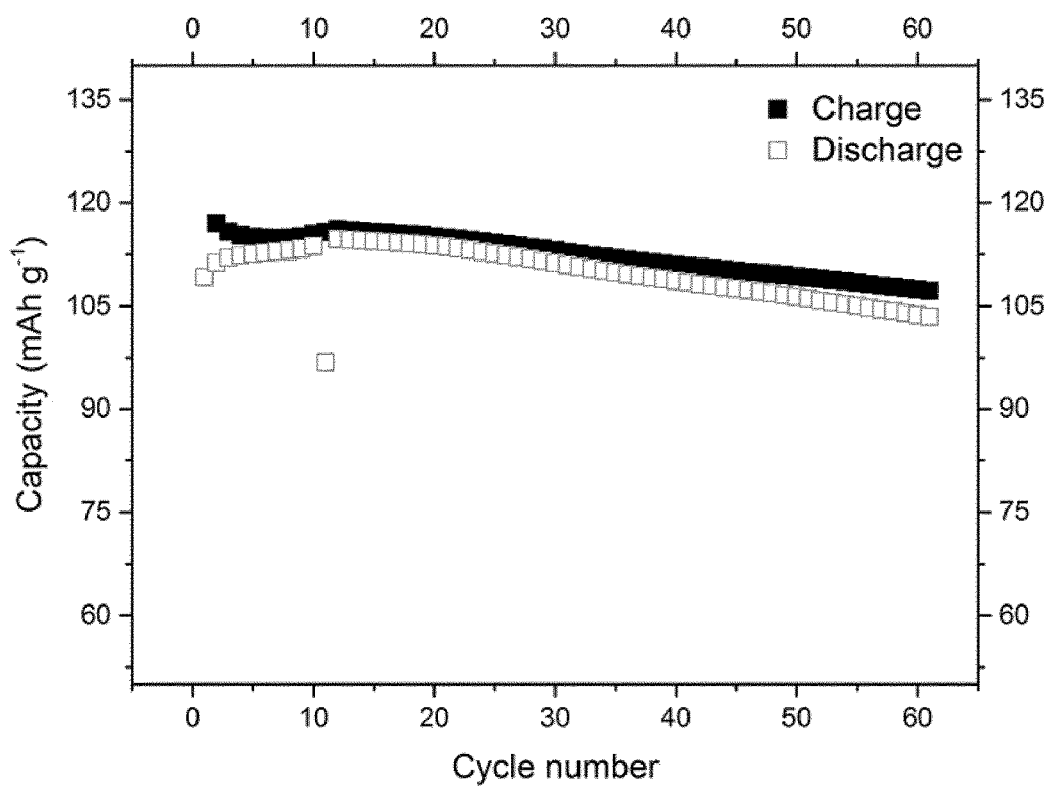

FIG. 16 gives the evolution of the capacity (in mAh $g^{-1}$ based on the positive electrode active material mass) as a function of the number of cycles for a Na-ion battery comprising a composition EC8 according to the invention as non-aqueous liquid electrolyte.

Figure 17:
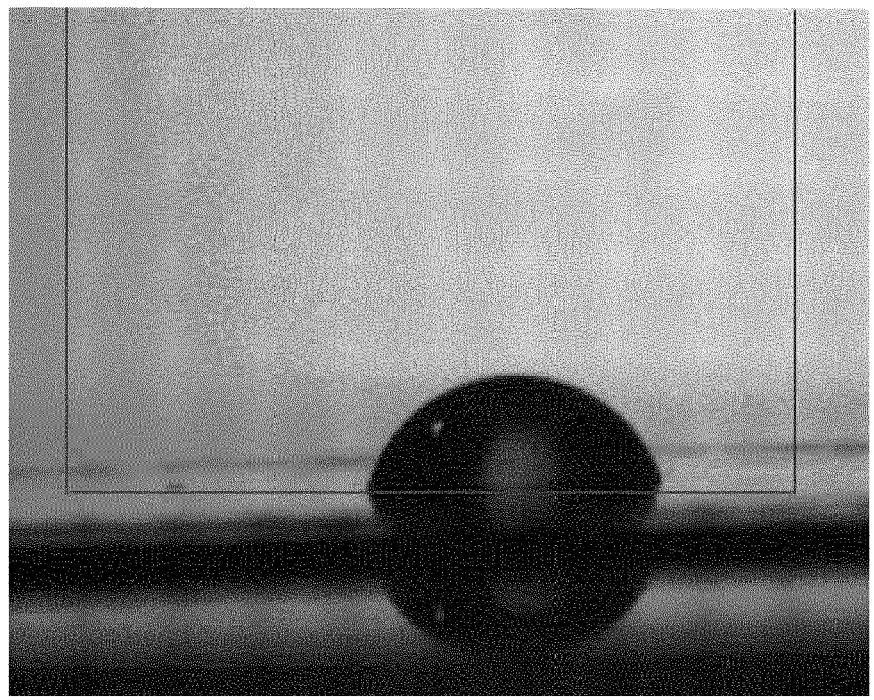

FIG. 17 gives the image of the comparative electrolyte composition EC1 onto PE separator.

Figure 18:
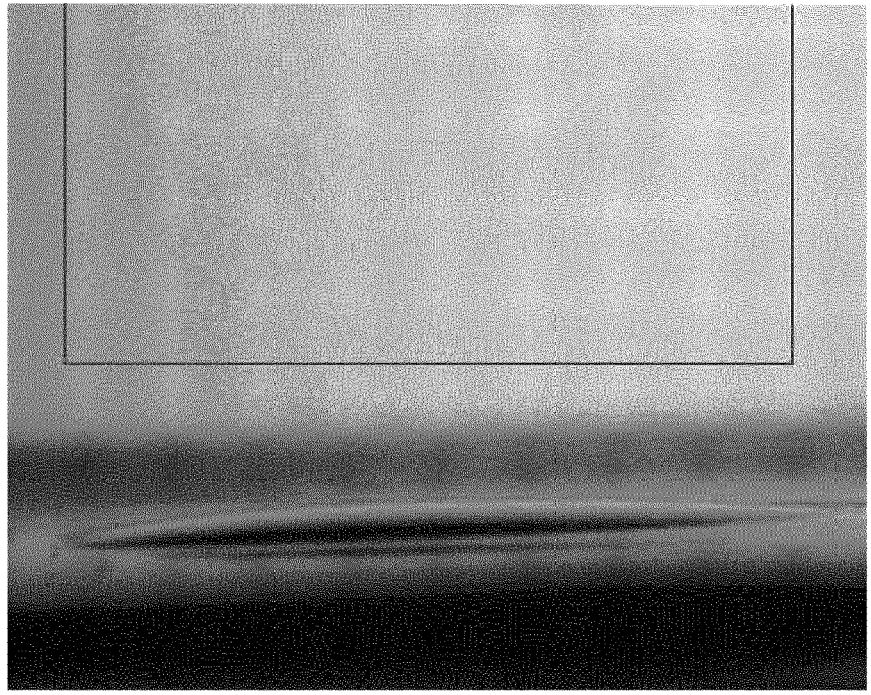

FIG. 18 gives the image of the electrolyte composition EC4 according to the invention onto PE separator.

EXAMPLES

Example 1

Preparation of Electrolyte Compositions

The following electrolyte compositions, EC1 (comparative composition) as well as EC2 and EC3, according to the present invention, comprising the additives detailed in the below table (in wt. %), have been prepared in a mixture of solvents EC/PC in a volume ratio of 1:1 comprising 1 mol/L of $NaPF_6$:

| Electrolyte Composition | NaODFB | TMSPi | Vinylene carbonate |
|---|---|---|---|
| EC1 (comparative) | — | — | — |
| EC2 (invention) | 0.5 | 1.0 | — |
| EC3 (invention) | 0.5 | 1.0 | 3.0 |

Electrolyte compositions EC2 and EC3 have been prepared by adding the additives into EC/PC solvent containing 1 mol/L of NaPF$_6$.

Some other compositions (comparative and according to the invention) have also been prepared. They comprise the additives detailed in the below table (in wt. %) and have been prepared in a mixture of solvents EC/DMC in a volume ratio of 1:1 comprising 1 mol/L of NaPF$_6$:

| Electrolyte Composition | NaODFB | TMSPi | Vinylene carbonate |
|---|---|---|---|
| EC4 (comparative) | — | — | — |
| EC5 (comparative) | — | 1.0 | — |
| EC6 (comparative) | — | — | 3.0 |
| EC7 (invention) | 0.5 | 1.0 | — |
| EC8 (invention) | 0.5 | 1.0 | 3.0 |

Example 2

Electrochemical Performances of Na-Ion Batteries Containing the Electrolyte Compositions of the Invention The effects of all the above-mentioned electrolyte compositions have been tested in coin cells having the following configuration.

The positive electrode was prepared by mixing Na$_3$V$_2$(PO$_4$)$_2$F$_3$ (NVPF, mass loading: 12.6 mg/cm$^2$), with PVdF 4.0 wt. %) and carbon black (4.0 wt. %). The resulting mixture was dispersed in N-methyl-2-pyrrolidone to form a homogeneous slurry, which then was casted onto a current collector made of an aluminum foil. The positive electrode was dried at 120° C. and then pressed by a roller machine.

The negative electrode was prepared by mixing hard carbon (mass loading 6.1 mg/cm$^2$) with carboxymethylcellulose (2.5 wt. %) and carbon black (3.0 wt. %). The resulting mixture was dispersed in water to form a homogeneous slurry, which then was casted onto a current collector made of an aluminum foil. The negative electrode was dried at 120° C. and then pressed by a roller machine.

The positive electrode, the separator (glass fiber separator Whatman®, GF/D) and the negative electrode have been dried at 85° C. under vacuum (less than 100 mbar) for 24 hours. Then, the 2032 type coin cells has then be assembled in inert atmosphere by stacking the positive, separator, and negative electrode, where water and oxygen content is less than 1 ppm. Lastly, different electrolyte compositions EC1 to EC8 have then been injected into the cells, which were sealed to assembling corresponding Na-ion batteries Na-B1 to Na-B8, respectively, comprising EC1 to EC8 as non-aqueous liquid electrolyte.

Self-discharge and cycling test procedure:
The whole process was carried out at 55° C.
Voltage range: 2.0-4.3 V
1. After assembling, the Na$_3$V$_2$(PO$_4$)$_2$F$_3$/hard carbon full cells (injected with different electrolytes) were charged-discharged for 10 cycles at C/10 (1C=128 mA g$^{-1}$).
2. The cell was charged to 4.3 V (100% SoC), then it was rested for 1 week without applying current but monitoring the voltage, followed by discharging the cell to 2.0 V. The whole cycle was denoted as self-discharge cycle, which is shown in the charge-discharge curves of the figures.
3. Then, the cell was charged and discharged at C/10, which was called as recovery cycle as shown in the figures as well.
4. Lastly, the cell was cycled at C/10 for 50 cycles.

As disclosed in the comparative examples (EC1, EC4, EC5 and EC6), electrolytes without any additives or with only a single one cannot achieve the purpose of both decreased self-discharge and enhanced capacity retention ability at 55° C.

In contrast, with the properly chosen combination of additives according to the present invention (like EC2 and EC7), the side reactions occurring at both positive and negative electrodes can be suppressed in a different scale, hence enabling to achieve good cycling performances. However, for even better results, i.e. for a full optimization leading to higher capacity retention capability and less capacity lost during the self-discharge tests coupled with high capacity recovery after self-discharge tests, the addition of vinylene carbonate is preferred.

It is the synergistic effect originated from the combination of additives with functional group (for example, phosphide group that bonds with transitional metal ions so as to cover the catalytic sites), which can modify the chemical nature, characteristic bonding structure of the SEI layer onto the positive and negative electrode surface.

Example 3

Wettability Ability of the Electrolyte Compositions of the Invention

To evaluate the wetting ability of the electrolyte, the contact angle measurements of the EC1 and EC4 electrolyte on the polyethylene (PE, Celgard® separator) film were performed by using KRUSS DSA100 device within 10 s. Firstly, the PE separator was placed onto the glass subtract flatly. Then, 10 uL of electrolyte was dipped onto the surface of separator. Lastly, the camera in the KRUSS DSA100 device captures the image of the liquid onto the separator, and the contact angle was analyzed.

Obviously, the EC1 electrolyte could not wet the PE separator, while EC4 can fully wet the PE separator.

Such results unambiguously confirm that EC4 electrolyte has much better wetting ability.

The invention claimed is:
1. An electrolyte composition comprising at least a sodium salt dissolved in at least one solvent and a combination of additives, wherein:
said solvent is selected from the group consisting of: ethylene carbonate, dimethyl carbonate, ethyl methyl carbonate, diethyl carbonate, propylene carbonate, ethyl acetate, ethyl propionate, methyl propionate, 4-fluorotoluene, 1,1,2,2-tetrafluoroethyl 2,2,3,3-tetrafluoropropyl ether, di-fluoro ethylene carbonate, ethyl difluoroacetate, and mixtures thereof;
the combination of additives includes at least sodium difluoro(oxalato)borate (NaODFB) and tris(trimethylsilyl)phosphite (TMSPi).
2. The electrolyte composition of claim 1, wherein the amount of sodium difluoro(oxalato)borate ranges from 0.05 to 10 wt. %, relatively to the total weight of said electrolyte composition.
3. The electrolyte composition of claim 1, wherein the amount of tris(trimethylsilyl)phosphite ranges from 0.05 to 10 wt. %, relatively to the total weight of said electrolyte composition.

4. The electrolyte composition of claim 1, wherein the solvent is a mixture of at least two solvents comprising ethylene carbonate as a first solvent and a second solvent selected from the group consisting of dimethyl carbonate, ethyl methyl carbonate, diethyl carbonate, propylene carbonate, ethyl propionate, and 1,1,2,2-tetrafluoroethyl 2,2,3,3-tetrafluoropropyl ether.

5. The electrolyte composition of claim 1, wherein the mixture of at least two solvents comprises a mixture of ethylene carbonate and propylene carbonate in a volume ratio of 1:1.

6. The electrolyte composition of claim 1, comprising sodium difluoro(oxalato)borate, tris(trimethylsilyl)phosphite, ethylene carbonate, and propylene carbonate.

7. The electrolyte composition of claim 1, further comprising dimethyl carbonate.

8. The electrolyte composition of claim 1, further comprising an additional carbonate selected from the group consisting of vinylene carbonate and vinylethylene carbonate.

9. The electrolyte composition of claim 8, wherein the amount of said additional carbonate ranges from 0.1 to 10.0 wt. %, relatively to the total weight of said electrolyte composition.

10. A method of manufacturing a Na-ion battery comprising adding the electrolyte composition according to claim 1 to the Na-ion battery, as a non-aqueous liquid electrolyte.

11. The method of claim 10, wherein said Na-ion battery comprises a hard carbon negative electrode including a binder.

12. A method of reducing self-discharge and to enhance retention capacity in a Na-ion battery, the method comprising using the electrolyte composition according to claim 1 as a non-aqueous liquid electrolyte.

13. A Na-ion battery comprising:
at least one positive electrode comprising at least one positive electrode active material and a current collector,
at least one negative electrode comprising a negative electrode active material, and
at least one separator impregnated with a non-aqueous liquid electrolyte, said separator being placed between said positive electrode and said negative electrode,
wherein said non-aqueous liquid electrolyte is an electrolyte composition as defined in claim 1.

14. The Na-ion battery of claim 13, wherein the negative electrode active material of the negative electrode is a carbon material and said negative electrode further comprises a polymer binder.

15. The Na-ion battery according to claim 14, wherein said polymer binder is carboxymethylcellulose.

* * * * *